United States Patent

Umezawa et al.

[11] 3,867,364
[45] Feb. 18, 1975

[54] PROCESS FOR THE SYNTHESIS OF LEUPEPTINS AND THEIR ANALOGUES

[75] Inventors: Hamao Umezawa, Tokyo; Shinichi Kondo, Yokohama; Takaaki Aoyagi, Fujisawa; Tomio Takeuchi; Kenji Maeda, both of Tokyo, all of Japan

[73] Assignee: Zaidan Hojin Biseibutsu Kagaku Kenkyu Kai, Tokyo, Japan

[22] Filed: Nov. 30, 1972

[21] Appl. No.: 310,975

Related U.S. Application Data

[63] Continuation-in-part of Ser. No. 877,046, Nov. 14, 1969, abandoned.

[30] Foreign Application Priority Data

Nov. 21, 1968  Japan................................. 43-84824
Nov. 30, 1968  Japan................................. 43-87292
June 11, 1969  Japan................................. 44-45369

[52] U.S. Cl. ........................... 260/112.5, 424/177
[51] Int. Cl... C07c 103/52, C07g 7/00, A61k 27/00
[58] Field of Search ................................. 260/112.5

[56] References Cited
OTHER PUBLICATIONS

Kondo et al., Chem. Pharm. Bull., 17, 1896–1901 (1969).
Kawamura et al., Chem. Pharm. Bull., 17, 1902–1909 (1969).

*Primary Examiner*—Lewis Gotts
*Assistant Examiner*—Reginald J. Suyat
*Attorney, Agent, or Firm*—Brady, O'Boyle & Gates

[57] ABSTRACT

Synthesis of leupeptins and their analogues represented by the general formula:

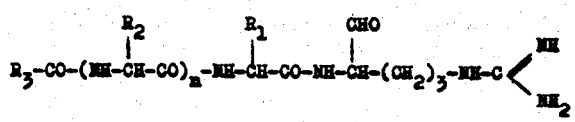

wherein
$n = 1$ or $0$
$R_3 =$ alkyl radical

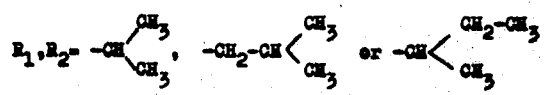

which comprises chemically treating the compound represented by the general formula:

wherein
$n$, $R_1$, $R_2$, $R_3$ are the same as described above, or the compound represented by the general formula:

wherein
$n$, $R_1$, $R_2$, $R_3$ are the same as described above.

13 Claims, No Drawings

PROCESS FOR THE SYNTHESIS OF LEUPEPTINS AND THEIR ANALOGUES

CROSS REFERENCE TO RELATED APPLICATION

This application is a continuation-in-part of applicants' copending application Ser. No. 877,046, filed Nov. 14, 1969, now abandoned.

This invention relates to synthesis of leupeptins and their analogues which are therapeutically useful substances effective in inhibiting enzymatic reactions of trypsin, papain, kallidrein, plasmin and thrombokinase, and in inhibiting fibrinolysis, kinin formation from kininogen and blood coagulation. Leupeptins have low toxicity and exhibit a therapeutic effect on inflammation in rats caused by carrageenin. They are useful for treatment of pancreatitis and inflammatory diseases, especially for inflammatory diseases in skin, for instance, burns.

Leupeptins were discovered by the present inventors by their systematic screening of an active compound, inhibiting fibrinolysis by plasmin in culture filtrates of Actinomycetes. It was also found by many strains of various species of Streptomycetes.

The structures of leupeptins and their analogues, which have been synthesized by the present inventors and are practically active substances, are represented as follows:

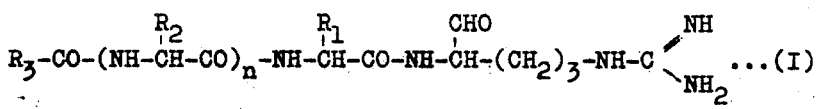

$n = 1$ or $0$
$R_3 = CH_3-$ or $CH_3-CH_2-$

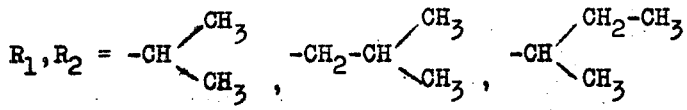

As shown by the formulae leupeptins are acetyl-L-leucyl-L-leucyl-DL-argininal, propionyl-L-leucyl-L-leucyl-DL-argininal and their analogues in which one of L-leucine is lacking and one or two of L-leucine is/or are substituted with L-isoleucine and/or L-valine.

The inventors attempted to synthesize the above leupeptins and their analogues. According to the present invention, leupeptins and their analogues represented by the above formula (I) can be synthesized by (A) oxidation of compounds represented by the following general formula (II) which can be produced by various processes already known.

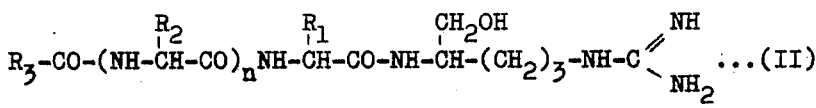

wherein
$n = 1$ to $0$
$R_2, R_1$ = same or different radicals such as

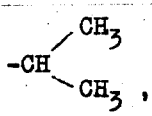

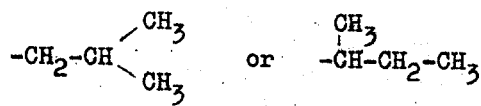

$R_3 = CH_3-$ or $CH_3-CH_2-$
or by (B) reduction of chemical compounds represented by the general formula

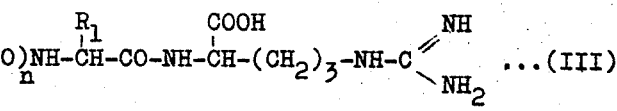

wherein, $n$, $R_2$, $R_1$ and $R_3$ are the same as the above. The compound (II) may be produced by reduction of the compound (III). The compound (III) such as acyl-leycyl-leucyl-arginine can be synthesized with L-leucine and arginine by the known peptide synthesis such as mixed acid anhydride method, dicyclohexylcarbodiimide method, nitrophenyl ester method, acid chloride method, azide method, carbonyl-diimidazole method, Woodward's reagent method of Merrifield solid phase method. In this process, the starting compounds such as arginine, its precursor (ornithine) or its derivative (NG-nitroarginine) can be used in the forms of either L, D or DL.

In the process of condensation of these amino acids, amino groups are protected by carbobenzoxy radical, tertiary butyloxycarbonyl radical, tosyl radical, trityl radical or phthalyl radical, and guanide radical is protected by nitro radical, carbobenzoxy radical or tosyl radical. Carboxyl radical is protected by various esters as employed in general. Acyl radicals such as acetyl or propionyl radicals can be introduced by known method using corresponding acid anhydride. If acetyl-L-leucine or propionyl-L-leucine is used as starting material, racemization may be produced at considerable extent.

In this invention, carboalkoxyl-L-leucine, L-leucine ester and dicyclohexylcarbodiimide were made reaction in organic solvent to yield carboalkoxy-L-leucyl-L-leucine ester. This ester was saponified and yielded crystals of carboalkoxy-L-Leucyl-L-leucine. This compound was reacted in organic solvent under the presence of Woodward's reagent K with arginine of which guanidine radical was protected in the form of $N^G$-nitro-L-arginine ester. Carboalkoxy-L-leucyl-L-leucyl-$N^G$-nitro-L-arginine, thus obtained, was acylated under the presence of palladiumcarbon to yield acyl-L-leucyl-L-leucyl-L-arginine ester. In this case, carboxyl radical may be substituted with other acid derivatives.

Acyl-L-leucyl-L-leucyl-L-arginine ester thus obtained was reduced in water, more preferably in anhydrous organic solvents under the presence of reducing agents such as lithium borohydride, sodium borohydride or lithium aluminum hydride at room temperature to about 150°C to yield acyl-L-leucyl-L-argininol. Reduction was achieved also by platinum catalyst.

Alternatively the end product of the above may also be yielded as follows; L-leucyl-L-leucyl-L-arginine ester or its acylated compound at its N-terminal and/or its $N^G$-nitro derivative was or were reduced by reducing agent such as lithium borohydride to yield the corresponding derivatives of L-leucyl-L-leucyl-L-argininol which is, then reduced by palladium carbon to follow acylation.

Acylated L-leucyl-L-leucyl-L-argininol thus obtained, was oxidized to give the corresponding leupeptins. For the oxidation, sulfoxide-carbodiimide reaction (refer to Journal of American Chemical Society, Vol. 87, No. 24, p. 5661, 1966) is more preferable in respects of mild formation of aldehyde radical without formation of carboxylic acid radical, than other methods for direct oxidation, such as using metal alkoxide or chromic acid.

Sulfoxide-carbodiimide reaction was proposed for a reaction in which 3'-O-acetylthymidine-5'-aldehyde was obtained by oxidation of primary alcohol of 3'-O-acetylthymidine. The inventors discovered the above reaction can be available for the conversion of C-terminal of peptide to aldehyde and this provides a great advantage for aldehyde formation in synthesis of leupeptins. This provides practically, for instance, argininol compound of the above was dissolved in anhydrous dimethylsulfoxide and added with both dicyclohexylcarbodiimide and anhydrous phosphoric acid at room temperature. The desired compound was separated from the reaction mixture by a conventional method and purified by column chromatography of active carbon with the yield of over 80 percent.

The presence of leupeptins in the reaction mixture was readily detected by anti-palsmin activity and/or by positive spot of Rydon-Smith reaction, Sakaguchi reaction or carbonyl reagent on thin layer chromatography using Silica gel G and solvent system of butanol : butyl acetate : acetic acid : water (4:2:1:1).

The present invention will be explained more in detail by way of examples as follows:

EXAMPLE 1

To a solution of carbobenzoxy-L-leucine (9.0 g, 0.034 moles), L-leucine ethyl ester hydrochloride (6.7 g, 0.034 moles) and triethylamine (4.8 ml, 0.034 moles) in 140 ml of chloroform, 7.0 g of N,N'-dicyclohexylcarbodiimide was added under cooling and stirring. Allowing to stand overnight in refrigerator, the mixture was filtered to remove crystalline N,N'-dicyclohexylurea appeared. The filtrate was evaporated to dryness in vacuo and the residue was dissolved in 150 ml of ethyl acetate. After removing insoluble N,N'-dicyclohexylurea by filtration, and the ethyl acetate solution was washed successively with 50 ml of 0.5N hydrochloric acid, 50 ml of water, 100 ml of 0.5M sodium bicarbonate and 50 ml of water. The solution was dried over anhydrous sodium sulfate and evaporated to dryness in vacuo yielding 12.0 g of crude powder. And, carbobenzoxy-L-leucyl-L-leucine ethyl ester was crystallized from the mixture of 30 ml of methanol and 10 ml of water to obtain 8.4 g of crystals at 65 percent yield, mp 85.5°–86.5°, $[\alpha]_D^{26}$ −50° (C=2, methanol). Anal. Calcd. for $C_{22}H_{34}O_5N_2$: C, 65.00; H, 8.43; N, 6.89.Found: C, 65.02; H, 8.67; N, 7.15.

Carbobenzoxy-L-leucyl-L-leucine ethyl ester (8.13 g 0.02 moles) was hydrolyzed at room temperature by 1N sodium hydroxide (22 ml) in ethanol (100 ml) for 3 hr. The solution was made acid with 1N hydrochloric acid (25 ml) and concentrated to about 50 ml under reduced pressure. The concentrate was extracted twice with 80 ml of ethyl acetate. The extract was washed with water (40 ml) and dried over anhydrous sodium sulfate and concentrated to about 40 ml and added petroleum ether (200 ml). After the mixture had been cooled, the crude crystals (7.31 g) were obtained, and recrystallized from a mixture of ethyl acetate (20 ml) and petroleum ether (60 ml) to yield 6.45 g (85 percent) of carbobenzoxy-L-leucyl-L-leucine as white crystals, mp 93°–95°, $[\alpha]_D^{26}$ −29° (c=2.9, methanol). Anal. Calcd. for $C_{20}H_{30}O_5N_2$: C, 63.47; H, 7.99; N, 7.40. Found: C, 63.64; H, 7.66; N, 7.67.

Carbobenzoxy-L-leucyl-L-leucine (6.43 g, 0.017 moles) was dissolved in 250 ml of nitromethane and then cooled in an ice water bath. Triethylamine (2.38 ml, 0.017 moles) and Woodward's reagent K (4.42 g, 0.017 moles) were added and the mixture was stirred for 1 hr. Then 4.6 g of $N^G$-nitro-L-arginine methyl ester hydrochloride (0.017 moles) and triethylamine (2.38 ml, 0.017 moles) were added, and the mixture was stirred for 5 hrs. and kept overnight at room temperature. The reaction mixture was evaporated to dryness in vacuo, and the residue was dissolved in ethyl acetate (400 ml). The ethyl acetate solution was then washed successively with water (200 ml), 0.5N HCl (100 ml), water (100 ml), 0.5M $NaHCO_3$ (200 ml) and water (100 ml), and dried over anhydrous sodium sulfate and evaporated to dryness in vacuo to gave 6.6 g (yield 65 percent) of carbobenzoxy-L-leucyl-L-leucyl-$N^G$-nitro-L-arginine methyl ester as a white powder, mp 75°–85°.

The ester (6.6 g, 0.011 moles) in a mixture of methanol (260 ml), water (40 ml) and glacial acetic acid (20 ml) was hydrogenated by aerating with hydrogen gas for 14 hrs. in the presence of palladium carbon (10 g) containing 5 percent palladium. The catalyser was removed by filtration and washed with 160 ml of methanol. The filtrate and washed solution were combined. The mixture was concentrated to syrup. The syrup L-leucyl-L-leucyl-L-arginine methyl ester diacetate (6.1 g) thus obtained was dissolved in a mixture of chloroform (80 ml) and benzene (40 ml), and acetic anhydride (3ml) was added. After keeping the mixture at room temperature for 8 hr, ethanol (20 ml) was added and then concentrated to gave acetyl-L-leucyl-L-leucyl-L-argine methyl ester acetate (5.9 g, syrup). The colorless syrup was hydrolyzed at room temperature by 1N sodium hydroxide (50 ml) in ethanol (50 ml) for 4 hr. The solution was neutralized with 1N hydrochloric acid (3 ml), and evaporated to dryness. The residue was extracted with water (60 ml) and the extract was applied to a column chromatography of Dowex 1 × 2 (100–200 mesh, OH form, 210 ml, Dow Chemical Co.) developing with water. The alkaline eluate giving positive Sakaguchi reaction was adjusted to pH 5.2 with Amberlite IRC 50 (H form, Rome and Haas Co.) and evaporated to dryness to gave 250 mg of a white powder. The next neutral eluate was evaporated to dryness in vacuo to gave 2.54 g of a white powder. The powders were combined and recrystallized from methanol-ether. Then, crystalline acetyl-L-leucyl-L-leucyl-L-arginine (1.67 g) was obtained. Total yield 22 percent, mp 262°–264° (decomp.), $[\alpha]_D^{19}$ −47° (c=1, methanol). Anal. Calcd. for $C_{20}H_{38}O_5N_6$: C, 54.28; H, 8.66; N, 18.99. Found: C, 54.50; H, 8.78; N, 18.75.

Acetyl-L-leucyl-L-leucyl-L-arginine (442 mg, 0.001 moles) in 40 ml of 0.48 percent hydrogen chloride in dry methanol was kept at room temperature for 24 hr. The solution was evaporated in dryness in vacuo to gave 518 mg of acetyl-L-leucyl-leucyl-L-argine methyl ester hydrochloride. To the ester hydrochloride dried over $P_2O_5$, excess of $LiBH_4$ (400 mg, 18 moles) in tetrahydrofuran (40 ml) was added and the mixture was refluxed gently at 90° in an oil bath. After 6 hr, the mixture was cooled and 9.5 percent hydrogen chloride in methanol (8 ml) was added to make a clear solution and concentrated to dryness. The residue was dissolved in 20 ml of water and extracted twice into 20 ml of butanol. The butanol extracts were combined and washed with 20 ml of water and evaporated to dryness in vacuo to gave 320 mg of a white powder. The powder was dissolved in 10 ml of butanol - butyl acetate - acetic acid - water (6:6:1:1 in volume) and applied to a column chromatography of silicic acid (Mallinckrodt, 10 g) developing with the same solvent. The eluate, which gave positive Sakaguchi reaction, was evaporated to dryness in vacuo to gave 150 mg (yield 31 percent) of acetyl-L-leucyl-L-leucyl-L-argininol hydrochloride as a white powder, mp 60°–75°, $[\alpha]_D^{20}$ −46° (c=1, methanol). Anal. Calcd. for $C_{20}H_{40}O_4N_6 \cdot HCl \cdot H_2O$: C, 49.73; H, 8.97; N, 17.40; Cl, 7.34. Found: C, 49.92; H, 8.79; N, 17.44; Cl, 6.98.

Acetyl-L-leucyl-L-leucyl-L-argininol hydrochloride (42.2 mg, 0.09 moles) thus obtained was dissolved in anhydrous dimethylsulfoxide (0.5 ml) containing N,N'-dicyclohexylcarbodiimide (77.9 mg, 0.39 moles) and anhydrous phosphoric acid (6.9 mg, 0.07 moles). Allowing to stand at room temperature for 7.5 hr, the reaction mixture was diluted with 10 ml of water and adjusted to pH 7.0 with 1N sodium hydroxide and N,N'-dicyclohexylurea appeared was removed by filtration. The filtrate was applied to a column chromatography using 1 g of carbon (Wako Pure Chem. Co.). The column was washed with water and then eluted with 0.02N hydrochloric acid in 80 percent methanol. The eluate, which gave positive Sakaguchi and red tetrazolium reactions, was evaporated to dryness in vacuo and 38.1 mg of a crude powder was obtained. Anti-plasmin activity: $ID_{50}$ 24 μg/ml. The crude powder (32.6 mg) in 2 ml of butanol was refluxed for 3 hr. To the solution, butyl acetate (2 ml) and water (4 ml) were added and mixed by shaking. The upper layer was concentrated to dryness yielding 21.1 mg of the di-n-butyl acetal hydrochloride, mp 60°–90°. The acetal hydrochloride (20.0 mg) in 2 ml of 0.01N hydrochloric acid was heated at 60° for 3 hr. The solution was adjusted to pH 6.0 with Amberlite IR 45 (OH form) and evaporated to dryness in vacuo yielding 14.3 mg of acetyl-L-leucyl-L-leucyl-DL-argininal hydrochloride as a white powder. Yield 40 percent. Antiplasmin activity: $ID_{50}$ 13 μg/ml, mp 65°–100°, $[\alpha]_D^{28}$ −42° (c=1, methanol). Anal. Calcd. for $C_{20}H_{38}O_4N_6 \cdot HCl \cdot H_2O$: C, 49.93; H, 8.59; N, 17.47; Cl, 7.37. Found: C, 50.26; H, 8.46; N, 16.92; Cl, 7.61.

EXAMPLE 2

Carbobenzoxy-L-leucyl-L-leucyl-$N^G$-nitro-L-arginine methyl ester (1.8 g, 0.003 moles) in a mixture of methanol (50 ml), water (10 ml) and propionic acid (5 ml) was hydrogenated in the presence of palladium carbon (2 g) containing 5 percent palladium for 18 hr. to obtain 1.7 g of L-leucyl-L-leucyl-L-arginine methyl ester propionate (colorless, syrup). The syrup was dissolved in a mixture of chloroform (20 ml) and benzene (10 ml), and propionic anhydride (1 ml) was added. After the mixture had been kept at room temperature for 18 hr., ethanol (10 ml) was added and then evaporated in vacuo to gave 1.6 g of syrup. The syrup was dissolved in a mixture of methanol (10 ml) and water (10 ml) and 1N sodium hydroxide solution (13.5 ml) was added. The mixture was stirred at a room temperature for 4 hrs. The reaction mixture was concentrated under reduced pressure to about 20 ml and freed from insoluble matters. Thereafter the syrup was applied to a column of Dowex 1 × 2 (OH form, 100— 200 mesh, 57 ml) and developed with water to collect eluate (40 ml) of positive Sakaguchi reaction. The eluate was adjusted to pH 5.2 with Amberite IRC 50 (H form) and evaporated to dryness in vacuo to gave a white powder (412 mg). Recrystallization of said powder from methanol-ether gave crystalline propionyl-L-leucyl-L-arginine (370 mg, 18 percent yield from carbobenzoxy-L-leucyl-L-leucine), mp 256°–258° (decomp.), $[\alpha]_D^{23}$ −55° (c=1.5, methanol). Anal. Calcd. for $C_{21}H_{40}O_5N_6$: C, 55.24; H, 8.83; N, 17.52. Found: C, 54.87; H, 8.72; N, 17.77.

Propionyl-L-leucyl-L-leucyl-L-arginine (254 mg, 0.56 moles) was esterified and reduced with $LiBH_4$ and purified by silicic acid column chromatography as described above. A white powder of propionyl-L-leucyl-L-leucyl-L-argininol hydrochloride (110 mg, 40 percent) was obtained, mp 70°–80°, $[\alpha]_D^{20}$ −38° (c=1, methanol). Anal. Calcd. for $C_{21}H_{42}O_4N_6 \cdot HCl \cdot H_2O$: C, 50.74; H, 9.13; N, 16.91; Cl, 7.13. Found: C, 50.97; H, 9.40; N, 17.02; Cl, 6.91.

Propionyl-L-leucyl-L-leucyl-L-argininol hydrochloride (60.7 mg) was oxidized by sulfoxide-carbodiimide reaction and purified by carbon chromatography as described above. A crude powder of propionyl-L-leucyl-L-leucyl-DL-argininal hydrochloride (55.5 mg, $ID_{50}$ 23 μg/ml) was obtained. The crude powder (52.7 mg) was converted to the di-n-butyl acetal hydrochloride (27.0 mg, mp 80°–105°). The acetal hydrochloride (11.1 mg) was converted to propionyl-L-leucyl-L-leucyl-DL-argininal hydrochloride (8.8 mg) by hydrolysis. Total yield 40 percent. Anti-plasmin activity: $ID_{50}$ 9 μg/ml, mp 75°–90°, $[\alpha]_D^{21}$ −46° (c=3, methanol). Anal. Calcd. for $C_{21}H_{40}O_4N_6 \cdot HCl \cdot H_2O$: C, 50.95; H, 8.76; N, 16.98; Cl, 7.16. Found: C, 50.59; H, 8.91; N, 16.58; Cl, 7.09.

EXAMPLE 3

As same as the above examples, acetyl-L-isoleucyl-L-valyl-L-arginine (decomposing point; 260°–262°C) of 430 mg yielded 50 mg of acetyl-L-isoleucyl-L-valyl-DL-argininal hydrochloride (white powder, mp. 120°–140°C).

EXAMPLE 4

As same as the above examples, acetyl-L-valyl-L-leucyl-L-arginine (mp. 180°–190°C) of 462 mg yielded 80.4 mg of white powder, acetyl-L-valyl-L-leucyl-DL-argininal hydrochloride (mp. 85°–100°C, $[\alpha]_D^{29}$ = −53° (MeOH) having anti-plasmin activity. $ID_{50}$ = 3.2 μg/ml).

EXAMPLE 5

Acetyl-L-leucyl-L-leucyl-L-arginine (88 mg) was added with 1 ml of thionyl chloride and reacted at room temperature with shaking for 1 hour. Orange Yellow precipitate was collected and evaporated in vacuo after addition of small amount of benzene. Hydrochloride of acetyl-L-leucyl-L-leucyl-L-arginine acid chloride (114 mg, yellowish red powder) was obtained and dissolved in a mixture of dimethylformamide (4 ml) and xylene (16 ml). This was heated on oil bath at 120°–130°C and added with 300 mg of palladium-BaSO$_4$ (palladium 5 percent) aerating by hydrogen gas. The catalyst was filtered and washed with methanol. Methanol fraction and filtrate were combined and evaporated in vacuo. The residue was dissolved in water (4 ml) and treated to extract by butanol (4 ml) twice after removing insoluble part. The extracts were combined and evaporated in vauco to yield 66 mg of brownish powder containing acetyl-L-leucyl-L-leucyl-DL-argininal (yield; 11 percent, anti-plasmin activity; about 15 percent).

EXAMPLE 6

As same as example 5, white powder of acetyl-L-isoleucyl-L-valyl-DL-argininal hydrochloride. (mp. 120°–140°C) was obtained.

EXAMPLE 7

Carbobenzoxy-L-leucine (12.2 g) (0.046 moles) was dissolved in nitromethane (550 ml) and added with both triethylamine (6.45 ml. 0.046 moles) and Woodward's reagent K (N-ethyl-5-phenylisoxazolium-3'-sulfonate) (12.0 g, 0.046 moles) while stirring under cooled state for 1 hour. Then, N$^G$-nitro-L-arginine-methyl ester hydrochloride (12.4 g, 0.046 moles) and triethylamine (6.45 ml, 0.046 moles) were added and stirred at room temperature for 6 hours followed by standing overnight. The reaction mixture was evaporated in vacuo to dryness and dissolved in mixture of water (300 ml) and ethyl acetate (600 ml). After shaking, ethyl acetate layer was washed by 0.5N hydrochloric acid (150 ml), water (150 ml), 0.5M sodium bicarbonate (150 ml) (twice) and water (150 ml) successively. The ethyl acetate layer thus washed was dehydrated and evaporated in vacuo to dryness to yield carbobenzoxy-L-leucyl-N$^G$-nitro-L-arginine methyl ester (11.3 g, yield; 51 percent). This compound (11.3 g, 0.024 moles) was dissolved in mixture of methanol (390 ml), water (70 ml) and glacial acetic acid (30 ml). To this solution, 15 g of palladium carbon (palladium 5 percent was added and aerated by hydrogen gas for 15 hours at room temperature. The catalyst was filtered and washed with methanol (100 ml). Methanol fraction and filtrate were combined, and evaporated in vacuo to dryness to obtain L-leucyl-L-arginine methyl ester diacetate (colorless, oily, 9.4 g). This oily substance was dissolved in mixture of chloroform (120 ml) and benzene (60 ml). To this solution, acetic anhydride (6 ml) was added and stand at room temperature overnight. After addition of ethanol (40 ml), the solution was evaporated in vacuo to yield acetyl-L-leucyl-L-arginine methyl ester acetate (colorless oily, 12 g). The acetate of this state can be available for successive reaction, although its purified crystals are available for characterization of this substance. For the purpose of the latter, its hydrochloride was produced as follows. The compound (12 g) was dissolved in ethanol (80 ml) and added with 1N sodium hydroxide (80 ml) with stirring for 4 hours at room temperature. Insoluble part in reaction mixture was filtered off and neutralized by 1N hydrochloric acid. After evaporation of this solution in vacuo to dryness, the residue was dissolved in water (35 ml) at pH 6.4 and insoluble part was removed. Soluble part was applied to the column filled with 380 ml of Dowex 1 × 2 (OH type, 100–200 mesh, the ion exchange resin of Dow Chemical Co.) and developed by water. Alkaline fractions and neutral fractions (pH 6.6 – 5.2) positive in Sakaguchi reaction were collected. Alkaline fraction was added with Amberlite CG 50 (H type, 100–200 mesh, ion exchange resin, Rome and Haas Co.) to adjust pH 5.2.This was combined with neutral fraction and evaporated to dryness in vacuo. The powder (1.85 g) thus obtained was recrystalized from methanol-ether. Thus, white crystals of acetyl-L-leucyl-L-arginine (1.50 g, mp. 170°–185°C, $[\alpha]_D^{20}$— –17° (c=1, methanol)) yield; 10 percent).

This compound (1.50 g) (0.005 moles) was dissolved in 0.5 percent hydrogen chloride-methanol (150 ml) and kept for 24 hours at room temperature. White powder of acetyl-L-leucyl-L-arginine methyl ester hydrochloride (1.76 g) was obtained.

This hydrochloride (1.57 g, 0.004 moles) was added with both tetrahydrofuran (160 ml) and lithium borohydride (1.7 g, 0.078 moles) and refluxed for 6 hours at 90°C. After cooling, the solution was added with 15.9 percent hydrogen chloride-methanol (20 ml) to acidic pH. This was evaporated in vacuo to dryness and the residue was dissolved in each 50 ml of water-butanol mixture. Each water layers were extracted twice with 50 ml of butanol. The extracts were combined and washed with water (20 ml). The butanol layer was evaporated to dryness and obtained crude powder (3.44 g). This crude powder was dissolved in mixture of butanol: butyl acetate: acetic acid: water (4:4:1:1) and the insoluble part was removed by filtration. The filtrate was applied to the column (32 mm diameter) filled with silicic acid (250 g) and developed by the same solvent as above (1450 ml). Further development by the solvent of butanol: butyl acetate: acetic acid: water (4:2:1:1) (1500 ml) and the fractions positive in Sakaguchi reaction were collected. The fraction combined was evaporated in vacuo to dryness and yielded acetyl-L-leucyl-L-argininol hydrochloride (white powder, 913 mg, yield; 60 percent) mp. 70°–90°C, $[\alpha]_D^{28}$ — –26° (c=1, methanol).

This compound (858 mg, 232 moles) was dissolved in anhydrous dimethylsulfoxide solution (10 ml) containing dicyclohexylcarbodiimide (2.27 g, 11.0 moles) and anhydrous phosphoric acid (119 mg, 1.2 moles). After standing for 17 hours at room temperature, water (50 ml) was added and adjusted pH to 7.0 by 1N sodium hydroxide. After the insoluble part was removed, the soluble part was applied to the columun (17 mm diameter) filled with active carbon (15 g). The column was washed with water and eluted with 80 percent methanol containing 0.02N hydrochloric acid. The fractions (85 ml) positive in Sakaguchi reaction were collected and evaporated in vacuo to dryness. Thus, acetyl-L-leucyl-DL-argininal hydrochloride was obtained (white powder, 614 mg, yield; 72 percent, mp. 90°–100°C, $[\alpha]_D^{23}$ –36° (in methanol). Found (percent): C; 45.81, H; 8.52, N; 18.94, Cl; 8.22. Calcd. for C$_{14}$H$_{27}$N$_5$O$_3$.HCl.H$_2$O: C; 45.71, H; 8.22, N; 19.04, Cl; 9.64. This product showed anti-plasmin activity (ID$_{50}$ = 9 mcg/ml).

EXAMPLE 8

As same as example 7, propionyl-L-leucyl-DL-argininal hydrochloride (white powder, 7 mg, mp. 95°–110°C) was obtained from propionyl-L-leucyl-DL-arginine (30 mg).

EXAMPLE 9

As same as experiment 7, acetyl-L-isoleucyl-DL-argininal hydrochloride (white powder, mp. 100°–120°C) was obtained from acetyl-L-isoleucyl-L-arginine (30 mg).

EXAMPLE 10

As same as experiment 7, propionyl-L-isoleucyl-DL-argininal hydrochloride (white powder, 6 mg, mp. 100°–120°C) was obtained from propionyl-L-leucyl-DL-arginine (30 mg).

The leupeptins prepared according to the method of the invention inhibit enzymatic reactions, blood coagulation and exhibit anti-inflammatory effects. The leupeptins may be administered orally or by intravenous or subcutaneous injection.

The leupeptins are well absorbed into the system after oral administration. 1000 mg/kg of a mixture of leupeptins were orally administered to rabbits weighing 2.0 – 2.5 Kg. At 30 minutes, 1, 2, 3, 4, 6, 8 and 24 hours thereafter, the concentrations in the serum were determined by testing the inhibition on fibrinogenolysis by plasmin. The amounts found were about 20, 150, 200, 60, 50, 40, 30 and 10μ g/ml respectively. The urine excreted during 0–2, 2–3, 3–5, 5–8 and 8–24 hours was collected and the amounts of excreted leupeptins therein were determined. About 20, 60, 175, 220 and 500 mg/total, respectively were found. A total of about 500 mg was found with most of it being excreted within 5 hours after the administration which indicates that at least 25 percent of that orally administered is absorbed.

The oral administration of leupeptins also exhibits anti-inflammatory effects. The oral administration of 100 mg/Kg of leupeptins and the same dosage of α-chymotrypsin administered intraperitoneally showed similar strengths of inhibition of carrageenin edema. Weak inhibition was observed upon the oral administration of 25.0 mg/Kg of leupeptins.

LD$_{50}$ data is as follows: in mice, 118 mg/Kg by intravenous injection, 1,405 mg/Kg by subcutaneous injection, 1,550 mg/Kg orally; in rats, 125 mg/Kg by intravenous administration, >4000 mg/Kg by subcutaneous, >4000 mg/Kg by oral; in rabbits 35 mg/Kg by intravenous administration, 300 mg/Kg by subcutaneous, and >1500 mg/kg by oral.

What we claim is:

1. Leupeptins and their analogues represented by the general formula:

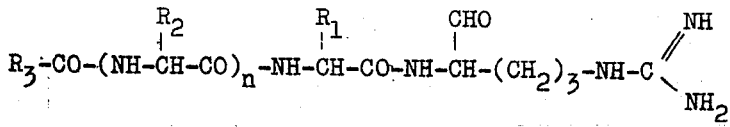

wherein $n = 1$ or 0, R$_1$,

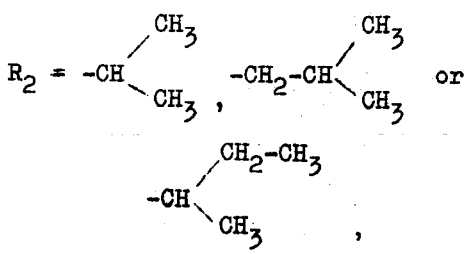

R$_3$ = alkyl radical

2. Acetyl-L-leucyl-L-leucyl-DL-argininal.
3. Propionyl-L-leucyl-L-leucyl-DL-argininal.
4. Acetyl-L-isoleucyl-L-valyl-DL-argininal.
5. Propionyl-L-isoleucyl-L-valyl-DL-argininal.
6. Acetyl-L-valyl-L-leucyl-DL-argininal.
7. Propionyl-L-valyl-L-leucyl-DL-argininal.
8. Acetyl-L-leucyl-DL-argininal.
9. Propionyl-L-leucyl-DL-argininal.
10. Acetyl-L-isoleucyl-DL-argininal.
11. Propionyl-L-isoleucyl-DL-argininal.
12. A process for the systhesis of leupeptins and their analogs represented by the formula:

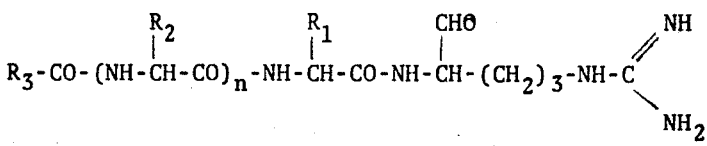

wherein
  $n$ - 1 to 0
  R$_3$ = alkyl

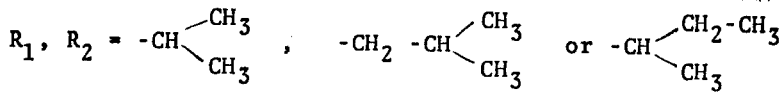

which comprises oxidizing a compound of the formula:

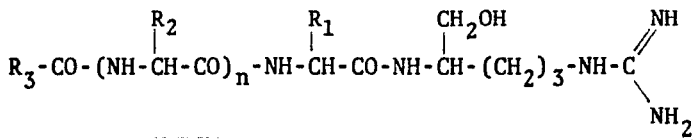

wherein $n$, R$_1$, R$_2$ and R$_3$ have the same meanings as above.

13. The process of claim 12 including the step of producing the starting alcohol by reducing a compound of the formula:

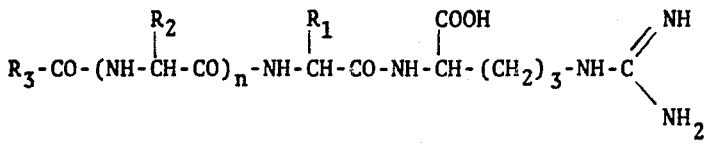

* * * * *